United States Patent
Hemmah et al.

(10) Patent No.: US 7,536,566 B2
(45) Date of Patent: May 19, 2009

(54) SYSTEM ARCHITECTURE FOR A POWER DISTRIBUTION NETWORK AND METHOD OF OPERATION

(75) Inventors: Steven M. Hemmah, Goffstown, NH (US); Robert A. Neidorff, Bedford, NH (US); Jonathan M. Bearfield, Raymond, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/234,899

(22) Filed: Sep. 26, 2005

(65) Prior Publication Data

US 2007/0074052 A1     Mar. 29, 2007

(51) Int. Cl.
*G06F 1/00* (2006.01)

(52) U.S. Cl. .................. 713/300; 713/320; 713/330; 713/340

(58) Field of Classification Search ............. 713/300, 713/320, 330, 340
See application file for complete search history.

(56) References Cited

U.S. PATENT DOCUMENTS

| | | | |
|---|---|---|---|
| 6,473,608 B1 | 10/2002 | Lehr et al. | 455/402 |
| 6,643,566 B1 | 11/2003 | Lehr et al. | 700/286 |
| 6,841,979 B2 | 1/2005 | Berson et al. | 323/282 |
| 6,952,737 B1 * | 10/2005 | Coates et al. | 709/229 |
| 7,117,272 B2 * | 10/2006 | Rimboim et al. | 709/250 |
| 7,136,778 B2 * | 11/2006 | Duron et al. | 702/182 |
| 7,145,439 B2 * | 12/2006 | Darshan et al. | 340/310.11 |
| 7,155,622 B2 * | 12/2006 | Mancey et al. | 713/324 |
| 7,231,281 B2 * | 6/2007 | Costa | 700/286 |
| 2005/0085212 A1 | 4/2005 | Peker et al. | 455/402 |

* cited by examiner

*Primary Examiner*—Thomas Lee
*Assistant Examiner*—Michael J Brown
(74) *Attorney, Agent, or Firm*—John J. Patti; Wade James Brady III; Frederick J. Telecky, Jr.

(57) ABSTRACT

Digital and analog functionality are separated and optimized in an Ethernet port architecture to free port circuit space for additional desired functionality. A power controller and physical link controller for the port share a high speed communication link to transfer information and control instructions from one to the other. The physical link controller provides digital functionality and processing capabilities that can generate power control instructions sent to the power controller over the high speed link. The power controller provides analog functionality for controlling the power supplied to the network connection and transfers power related information to the physical link controller over the high speed communication link and receives control instructions through a digital interface. The separation of digital of analog functionality simplifies the power control circuitry, removes redundancy, and frees valuable circuit board space for other desired functionality.

19 Claims, 2 Drawing Sheets

SYSTEM ARCHITECTURE FOR A POWER DISTRIBUTION NETWORK AND METHOD OF OPERATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to a system architecture for a power distribution network and a method of operating the architecture. The present invention relates more specifically to a transceiver and control circuit architecture for power over Ethernet and a method for providing and operating the architecture.

2. Description of Related Art

The development of sophisticated networks for transferring information has driven a number of technologies including the provision of power over network connections. For example, a network connected device for transferring information over the network may receive power from the network so that alternate power sources for the devices are not necessary. A typical advantage associated with providing power over a network is that a user can physically connect a device to the network to transfer information, and the device can be powered without the need of batteries or running additional power lines to the physical location of the user. A well known example of a communication network is based on an Ethernet protocol, based on IEEE 802.3 specifications, where information is exchanged between various senders and receivers connected to the network, often through a switch. Power over Ethernet (POE) may be provided through power sourcing equipment (PSE) that distributes power to powered devices (PDs) in a network environment. The network environment for realization of a POE system typically supports IEEE 802.3af specifications.

POE equipment typically includes PSE controller ICs that deal with management of the supplied power over the Ethernet connection. The PSE ICs and associated circuitry are provided as a mix of digital and analog components and circuits that are used to control power supplied to the Ethernet connection, and supply feedback concerning power status to a host or other master control.

Each Ethernet port includes a transceiver controller to provide signaling control over the Ethernet connection. The transceiver control is often referred to as the physical or PHY layer, and is composed mostly of digital circuitry for controlling the flow of information into and out of the Ethernet port connection.

PSE devices typically provide a number of ports to permit multiple Ethernet connections in a module. Often because of the number of ports in a PSE device, component and board space is at a premium. That is, the port connector modules in the PSE devices can include signaling input and output control, information input and output connections, LED drivers and LED devices, power supply controllers for supplying power to each port, as well as connections for bringing power to each port connector. Accordingly, the port connector module has extremely limited space for additional functionality that would be desired for the realization of a number of POE or other applications, for example. It would be desirable to free up as much space as feasible in the port connector module of the PSE device for additional functionality and applications.

SUMMARY OF THE INVENTION

In accordance with the present invention, there is provided a system architecture and method of operation that separates analog and digital features and functionality between power control devices and communication link devices in PSE and PD modules in a distributed network environment. An Ethernet port module with a controller for support of the physical communication layer is reconfigured to include digital circuitry or functionality that is used in support of a power control circuit. The power control circuit controls power delivered to the active POE Ethernet ports, while the PHY controller supplies control for the communication links in the port module. The power controller functionality that is usually furnished through digital circuits or digital processing is provided through a high speed communications link, between the PHY controller and the power controller. The separation of analog and digital features or functionality between the PHY controller and the power controller eliminates a large amount of redundancy and permits a much smaller realization of the power controller to significantly reduce the space use in the port module for providing POE. The space that is freed up can be used for other highly desirable functionality in the port module.

According to an exemplary embodiment of the present invention, the PHY controller and the POE power controller share or occupy a single PCB. In accordance with the architecture and method of the present invention, the PCB space occupied by the PHY and power controller is significantly reduced, further reducing cost of the solution. In accordance with another aspect of the invention, the PSE and Ethernet PHY transceiver system architecture is integrated together to reduce cost over a separate component architecture.

Examples of functionality that can be implemented in the space freed up by the simplified POE power controller include PSE control, power FET control, current sense resistors, current measurements, voltage measurements, temperature measurements, LED drivers and priority shut down control.

Because of the digital nature of the PHY controller, it is straightforward to implement digital functionality and features without significant modification to the fundamental operation of the PHY controller. Accordingly, additional space involved in maintaining digital functionality in the power controller can be freed, and digital circuitry can be reduced or eliminated to greatly simplify the power controller. An example of functionality that can be easily accommodated in the PHY controller that may be redundant in the power controller is local computation related to power management. The computations can be done with digital circuitry existing in the PHY controller and the results can be transported over a high speed link to the power controller for implementation of a power control function.

According to an advantage of the present invention, the power controller includes analog to digital converters (ADCs) and digital to analog converters (DACs) that transform analog information into digital form and vice versa, which can be transferred over the high speed link. The power controller may maintain a minimal set of registers for storing digital information for use with the high speed link to the PHY controller. In addition, the registers can be two-way, dual access or dual ported to permit the power controller to send and receive information to and from the PHY controller, respectively. Alternately, or in addition the PHY controller may include ADCs and DACs, and the high speed link can be analog in nature.

In accordance with the present invention, a POE port module can have greater functionality and be manufactured less expensively when the analog portions are simplified to remove digital circuitry and functionality. For example, the power control circuitry, or power PCB, can be more easily manufactured when there is less digital circuitry or less functionality to be included in the power controller.

In accordance with another aspect of the present invention, the PHY controller handles control functions for the POE power controller including response to transient conditions. For example, the PHY controller provides functionality for detecting and responding to over current conditions, under voltage or over voltage conditions and other responses related to feedback sensing and control. The PHY controller can also be used to implement sophisticated algorithms for managing network power in both the PSE and PD components of the network.

According to another aspect of the present invention, a complementary PHY and power controller chip set or integrated circuit board can be provided that is simplified and has reduced costs. The simplified and less expensive solution can be more easily implemented in the devices attached to the network, whether the devices are receiving power or supplying power in the POE power distribution system.

BRIEF DESCRIPTION OF THE DRAWINGS

The present invention is described in greater detail below, with reference to the accompanying drawings, in which.

DETAILED DESCRIPTION OF THE PREFERRED EMBODIMENTS

Figure 1:
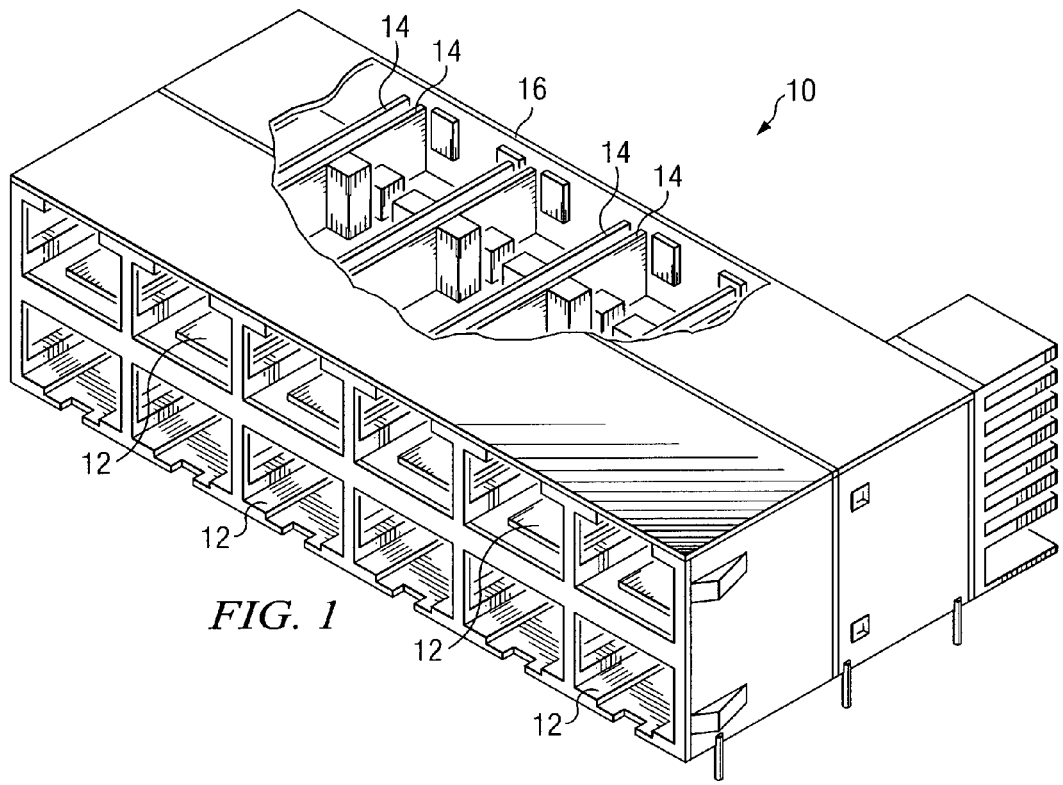
FIG. 1 is a perspective view of a POE port module.

Referring now to FIG. 1 a POE port module is illustrated generally as module 10. Module 10 includes a number of ports 12 for receiving cabling connectors, such as RJ45 connectors, for delivering distributed power over a network, such as POE. Each port 12 has associated electronic devices in module 10 to support POE and network communication functions. Each port 12 has an associated printed circuit board (PCB) 14 that handles functions including LED lighting indications or LED drivers and magnetic control of port connections, for example. PCBs 14 may also include capacitors and resistive elements to meet electronic operation requirements or ratings, such as in the range of 2 kV. In addition, each PCB 14 can have optical coupling components for signal isolation from electronic noise. Vertical PCBs 14 can also include connections for light pipes to transfer LED output to a front of ports 12. PCBs 14 can also include power components and electrical connections for supplying POE.

PCBs 14 are connected to a power and control board 16 that includes power control electronics, such as power control ICs. Power board 16 provides power control functions such as current sensing, under voltage, and over voltage detection, over temperature sensing and transient response, for example.

Prior Ethernet port modules that did not supply power typically did not include a power board 16, or power board 16 was used simply for the purpose of driving LEDs or other local power requirements. The functionality for the port module related to the physical communication elements was previously supplied on a system board to which the port module was connected.

Figure 2:
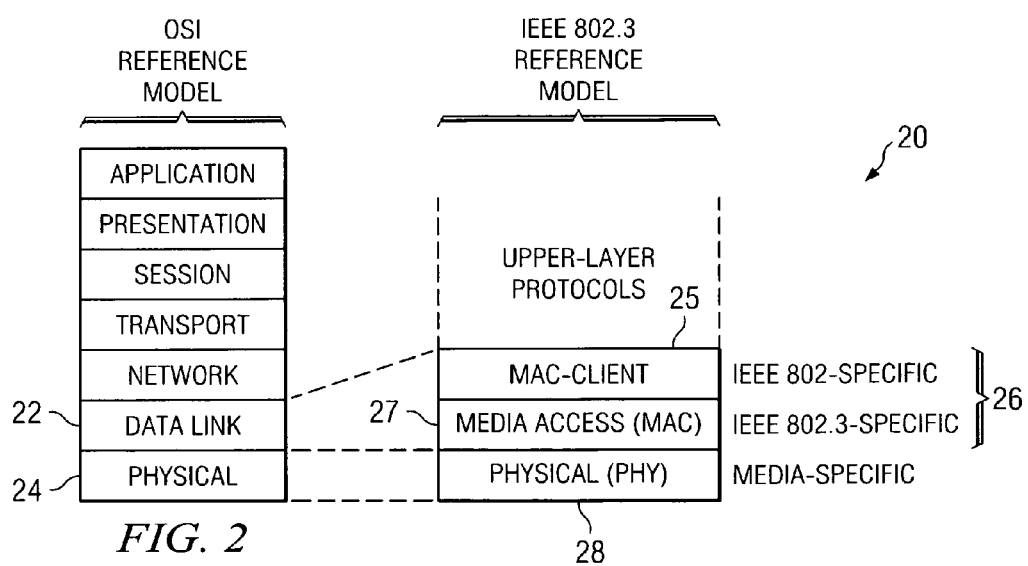
FIG. 2 is an abstract block diagram of a communication reference model for POE.

Referring to FIG. 2, an illustrative communication reference model is shown as model 20. Model 20 illustrates the different layers of operability involved in communication over a given media, such as a network. The present application is concerned mostly with the last two layers, data link 22, and physical layer 24. Data link layer 22 is modeled in the abstract as two separate layers to accommodate the provision of POE. Data link layer 22 is often referred as the media access control layer, or MAC layer 26. Model 20 shows MAC layer 26 divided into two sublayers, a MAC client sublayer 25 that is IEEE 802 specific, and a MAC sublayer 27 that is IEEE 802.3 specific. A physical or PHY layer 28 provides the media specific connection between MAC layer 26 and the wire connections of the network. MAC layer 26 is typically involved in data format and transmission, with functionality that includes such tasks as flow control and frame reception and transmission.

PHY layer 28 is involved in the actual transmission of data onto network lines and the reception of data incoming from network lines. Different transmission rates, for example, indicate a different realization of physical layer 28. Physical layer 28 is responsible for media dependent physical coding, multiplexing and synchronizing of outgoing symbol streams as well as symbol code alignment, demultiplexing and decoding of incoming data. Abstract PHY layer 28 also provides control signaling for transmitters and receivers, or transceivers, and clock recovery logic for received data streams. PHY layer 28 is also operable to perform auto negotiation in which connected network devices are able to exchange network information to determine the best operational mode each can support for communication.

Due to the nature of the functionality of the PHY layer, it can be implemented with digital circuits and digital functionality. In a network switch, a port module such as module 10 can be provided with a single PHY controller that is specific to the media, or switch connections, and can often be realized on a single chip or PCB that handles a number of ports, such as the twelve ports illustrated in module 10. The digital nature of the PHY controller permits sophisticated control of the physical communication link, such as may be achieved through the application of algorithms for optimizing PHY layer functionality or cooperation with the switch host.

With respect to the distributed power provided by POE, previous power controllers located on PCB 16 included some level of digital circuitry or functionality to permit storage of digital values, computations or algorithm implementation, for example. Due to the analog nature of the power controller, it is somewhat challenging to provide a digital control in the power controller, due to considerations related to isolation and electrical noise, which may have an impact on the robustness of a digital control, for example. If it is desired to obtain further functionality in the power controller, related to more sophisticated or additional power control techniques, implementation in the digital section of the power controller can be somewhat difficult, or can be somewhat costly to realize. However, due to the nature of a distributed power network, it would be highly desirable to provide additional features and functionality for the control of power provided over a link that also includes data exchange.

Figure 3:
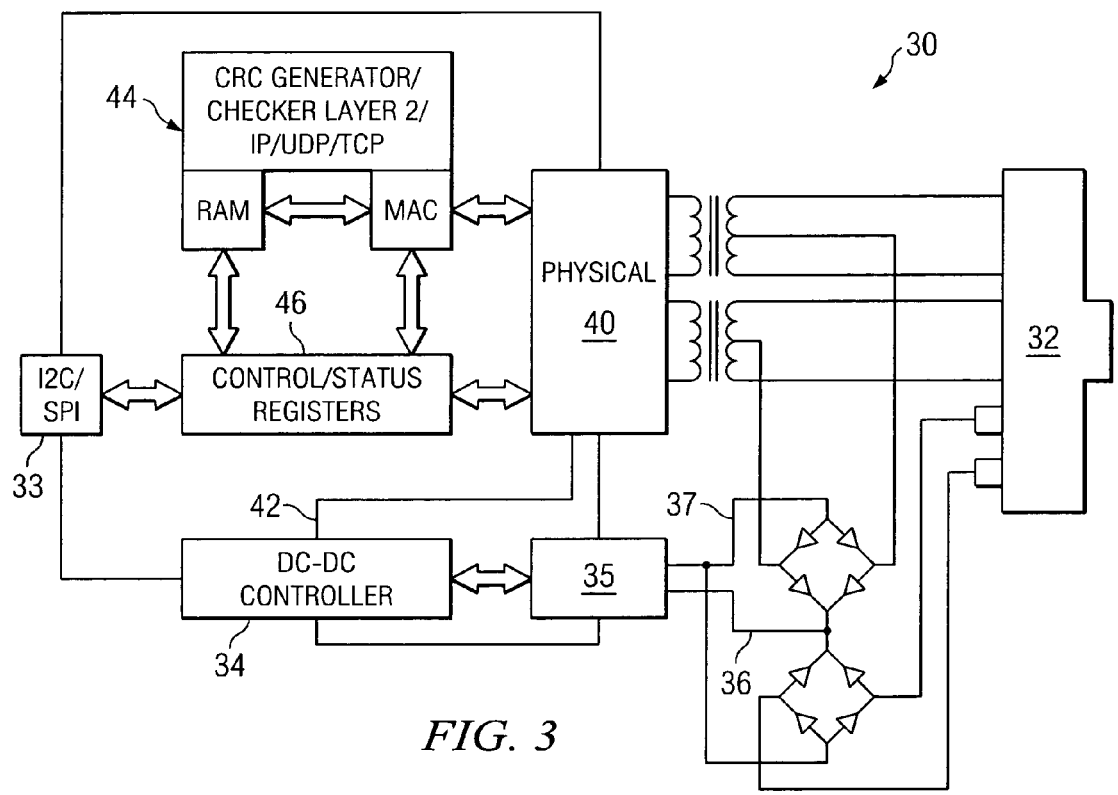
FIG. 3 is a block diagram of an architecture and operation of a POE port according to the present invention.

Referring now to FIG. 3, a block diagram of a port control architecture is illustrated generally as control 30. Control 30 illustrates the interaction between the various components that can make up the reference model layers of MAC layer 26 and PHY layer 28 for a port 32. Control 30 can be used in a PD or a network switch since the arrangement of the communication and power link can be in either direction, or can be symmetrical in nature. Such symmetrical considerations in a network environment can lead to the development of solutions that can be implemented in either a PD or a switch without changing the characteristics of the component to permit a reduction in cost of the components, since no distinction need to be made between components supplied to the PD and the switch.

Control 30 includes a DC-DC controller 34 that provides power control for power lines 36, 37 which supply power to power interface 35, or transmit power from power interface 35. Controller 34 is also coupled to an interface 33 for communicating with another system, such as a host computer. Interface 33 can take any number of forms, with I2C and SPI interfaces being common examples.

Control 30 also includes a PHY controller 40 that provides the physical layer of communication control for port 32. PHY controller 40 translates the non-media specific commands produced by a MAC 44 and registers 46 into media specific operations to handle the physical communication over port 32. PHY controller 40 is typically realized as a PCB with various IC components that include digital ICs for managing the functionality of PHY controller 40. Alternately, or in addition, PHY controller 40 may be realized as a single digital IC component operable to drive the physical media. PHY controller 40 includes digital control circuitry and functionality that may include a processing engine for executing instructions relating to algorithms for managing the physical communication link. PHY controller 40 may be located on a system board in relatively close proximity to port 42, or may be located on a board such as PCB 16 in port module 10. PHY controller 40 typically controls a number of ports 12, 32 in port module 10, but can be configured to control a single port 32.

PHY controller 40 can also be viewed as a parallel to serial communication converter, because it takes parallel information provided MAC 44 and registers 46 and converts it to serial data provided to port 32, and vice versa. PHY controller 40 typically supports high speed communication, indicating that the conversion of data between serial and parallel forms happens at high speed, meaning that PHY controller 40 includes a powerful processing engine. PHY controller 40 also contributes to detection and support of various communication speeds, such as combinations of 10/100-megabit or 10 megabit alone, for example.

In accordance with the present invention, the digital circuitry and processing power included in PHY controller 40 are used to advantage to simplify the functionality of DC-DC controller 34. Digital control logic and processing capacity in DC-DC controller 34 are transferred to PHY controller 40, which can easily accommodate the additional functionality, leaving DC-DC controller as a mostly analog control. Because it is desirable to have the ability to apply algorithmic or digital control to DC-DC controller 34, and provide a response to power transients or other power control events in a rapid and predetermined fashion, a high speed link 42 is provided between DC controller 34 and PHY controller 40 to communicate power control information. High speed link 42 is a two-way communication link providing sense data to PHY controller 40 for example, and transferring control instructions from PHY controller 40 to DC-DC controller 34. While mostly analog in operation, DC-DC controller 34 includes a digital interface for sending and receiving digital information over high speed link 42 in an exemplary embodiment. For example, controller 34 can sense current in power interface 35 over power lines 36,37 and send the sensed information to PHY controller 40 in digital form. PHY controller 40 can use the digital information supplied by controller 34, and determine a control response that can be communicated to and implemented by controller 34. Accordingly, controller 34 need not have the additional circuitry and functionality associated with determining a control response based on the sensed current, for example. The additional functionality is easily accommodated in PHY controller 40 because of the already present processing power and digital circuitry contained within PHY controller 40.

By simplifying controller 34, a great deal of space on PCB 16 can be freed up, since controller 34 can be made much smaller owing to the reduced amount of digital circuitry and functionality in controller 34. High speed link 42 can be a very simple communication link that can be as simple as a single line for digital communication, or multiple lines to permit increased communication speed, for example.

The reduction in complexity of controller 34 also leads to a reduced cost and size for controller 34. With the removal of the digital circuitry and functionality, controller 34 is less busy with the support circuitry and devices used with digital control and processing. Because high speed link 42 is simple and fast, there is little overhead associated with communicating information between controller 34 and PHY controller 40. The digital circuitry and functions provided by PHY controller 40 can operate at a very high speed that is sufficient for a response to power transients in power lines 36, 37, for example. In addition, PHY controller 40 can be physically located on a PCB with DC-DC controller 34 so that the physical proximity improves control and communication between the components. The resulting architecture tends to optimize the digital and analog functionality provided for operating port 32, while reducing digital circuitry in PCB 16, for example.

The additional functionality provided to PHY controller 40 can also serve the control needs of POE provided to port 32 and can be simply implemented and made programmable. For example, PHY controller 40 can be set to provide control instructions to DC-DC controller 34 in accordance with various standards or applications such as the IEEE 802.3af specification for POE. Other functionality can also be selectively realized, such as a device priority shut down or other distributed power network functionality that may be desired for a particular application. Furthermore, additional functionality can be provided to port module 10 through the implementation of circuitry on PCB 16 to provide desired functionality in a POE environment. Some examples of additional functionality that may be desirable in a given application, are PSE control, power FET control, current sense resistors, current measurements, voltage measurements, temperature measurements, LED drivers and priority shut down control.

It should be apparent that although the present invention is described in relation to communication in an Ethernet network, the same concept is equally applicable to power distribution systems in general. For example, it may be desirable to provide information and power over the same lines or over the same cabling in a given power distribution environment. The present invention is suitable for use in such a system, even if the power distribution network is a high power, high voltage transmission line, such as a 13.8 kv power transmission line. Similarly, the present invention is suitable for AC or DC applications and may be applied wherever digital information and power is supplied over the same cabling path or carriers.

Although the present invention has been described in relation to particular embodiments thereof, other variations and modifications and other uses will become apparent to those skilled in the art from the description. It is intended therefore, that the present invention not be limited by the specific disclosure herein, but to be given the full scope indicated by the appended claims.

What is claimed is:

1. A power distribution architecture for power distributed over an information network, comprising:
a digital physical (PHY) link controller coupled to one or more network lines for controlling transmission of information over the one or more network lines, wherein the digital physical (PHY) link controller translates non-media specific commands into media specific commands;
a DC-DC power controller coupled to the one or more network lines for controlling power supplied over the one or more network lines to a network powered device while active;
a high speed communication link between the physical link controller and the power controller for transmitting power supply related information from the power controller to the physical link controller and for transmitting control instructions from the physical link controller to the power controller; wherein at least some of the digital control logic and processing functionality for the power controller is provided by the physical link controller through the high speed communication link.

2. The architecture according to claim 1, wherein the network is an Ethernet network capable of supplying distributed power over the one or more network lines; and wherein the power controller controls power delivered to an active Ethernet port, while the PHY controller supplies control for port communication.

3. The architecture according to claim 1, wherein the physical link controller and the power controller are integrated circuits (ICs).

4. The architecture according to claim 1, wherein the physical link controller and the power controller are both on a same printed circuit board (PCB).

5. The architecture according to claim 1, wherein the physical link controller is operable to provide control instructions to the power controller to maintain a power over Ethernet specification.

6. The architecture according to claim 1, wherein the power controller further comprises a digital interface for the high speed link operable to transmit and receive digital information relating to power sensing and control.

7. The architecture according to claim 6, further comprising one or more of an analog to digital converter or a digital to analog converter in the power controller and coupled to the digital interface.

8. The architecture according to claim 1, wherein the high speed link is an analog link.

9. The architecture according to claim 1, wherein the PHY controller is coupled to a single network line, the power controller is coupled to a single network line and both are located in a powered device.

10. The architecture according to claim 1, wherein the PHY controller and the power controller are located in a network switch.

11. A method for controlling power supplied over a communication network to a network powered device while active, comprising:
controlling information flow over a network path with a digital physical (PHY) link controller, wherein the digital physical (PHY) link controller translates non-media specific commands into media specific commands;
controlling power supplied over the network path with a DC-DC power controller that includes analog control functionality;
communicating power supply information to the digital controller over a high speed communication link; and
communicating power control instructions to the power controller over the high speed communication link.

12. The method according to claim 11, further comprising converting analog power information to digital power information for transmission to the digital controller over the high speed communication link.

13. The method according to claim 11, further comprising converting digital power control instructions from the digital controller to an analog format for use by the power controller.

14. A power over Ethernet control system, comprising:
a physical (PHY) link controller coupled to an Ethernet network connection for controlling information flow over the network connection, wherein the digital physical (PHY) link controller translates non-media specific commands into media specific commands;
a DC-DC power controller coupled to the network connection for controlling power supplied over the network connection to a network powered device while active;
a high speed communication link connecting the physical link controller and the power controller to permit high speed transfer of information between the controllers, whereby the power controller can send power related information to the physical link controller, and the physical link controller can send power control instructions to the power controller.

15. The system according to claim 14, wherein the high speed communication link is a digital communication link.

16. The system according to claim 14, wherein the controllers share a printed circuit board (PCB) in a port module.

17. The system according to claim 14, wherein the power controller further comprises a digital interface coupled to the high speed communication link.

18. The system according to claim 14, wherein the system is realized in a powered device.

19. The system according to claim 14, what the system is realized in a network switch.

* * * * *